US012717090B2

(12) United States Patent
da Silva et al.

(10) Patent No.: US 12,717,090 B2
(45) Date of Patent: Aug. 25, 2026

(54) FIBER OPTIC RECEPTACLE HAVING AN ALIGNMENT ASSEMBLY

(71) Applicant: CORNING RESEARCH & DEVELOPMENT CORPORATION, Corning, NY (US)

(72) Inventors: Flavio Puppin Moreira da Silva, Niteroi (BR); Luiz Alberto Lourenco Rozo, Rio de Janeiro (BR); Rodrigo Resende Machado, Lcarai (BR); Willian Souza Silva, Rio de Janeiro (BR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 722 days.

(21) Appl. No.: 18/109,456

(22) Filed: Feb. 14, 2023

(65) Prior Publication Data

US 2023/0258874 A1 Aug. 17, 2023

Related U.S. Application Data

(60) Provisional application No. 63/310,479, filed on Feb. 15, 2022.

(51) Int. Cl.
*G02B 6/38* (2006.01)

(52) U.S. Cl.
CPC ......... *G02B 6/3825* (2013.01); *G02B 6/3874* (2013.01)

(58) Field of Classification Search
CPC ................................ G02B 6/3873; G02B 6/38
USPC ........................................................ 385/138
See application file for complete search history.

(56) References Cited

U.S. PATENT DOCUMENTS

| | | | |
|---|---|---|---|
| 4,684,205 | A | 8/1987 | Margolin et al. |
| 5,129,023 | A | 7/1992 | Anderson et al. |
| 5,179,608 | A | 1/1993 | Ziebol et al. |
| 5,261,019 | A | 11/1993 | Beard et al. |
| 5,293,582 | A | 3/1994 | Beard et al. |
| 5,317,663 | A | 5/1994 | Beard et al. |
| 5,436,995 | A | 7/1995 | Yoshizawa et al. |
| 5,542,015 | A | 7/1996 | Hultermans |
| 5,671,310 | A | 9/1997 | Lin et al. |
| 5,781,680 | A | 7/1998 | Womack et al. |
| 5,862,282 | A | 1/1999 | Matsuura et al. |
| 6,048,103 | A | 4/2000 | Furukata et al. |

(Continued)

FOREIGN PATENT DOCUMENTS

| | | | |
|---|---|---|---|
| CN | 1668953 | A | 9/2005 |
| GB | 2468442 | A | 9/2010 |

(Continued)

*Primary Examiner* — Kaveh C Kianni
(74) *Attorney, Agent, or Firm* — Tamika A. Crawl-Bey

(57) ABSTRACT

A fiber optic receptacle includes a receptable housing defining an internal cavity opening through an internal end and an opposing external end; an alignment assembly disposed within the internal cavity defined by the receptacle housing and received through the internal end, the alignment assembly comprising a plurality of alignment supports and an alignment sleeve having ends contained with each alignment support; and a retainer for retaining the alignment assembly within the internal cavity defined by the receptacle housing, the retainer having an opening and a plurality of tangs disposed about the opening.

17 Claims, 12 Drawing Sheets

(56) References Cited

U.S. PATENT DOCUMENTS 6,126,325 A 10/2000 Yamane et al.
6,152,608 A 11/2000 Ghara et al.
6,252,608 B1 6/2001 Snyder et al.
6,347,888 B1 2/2002 Puetz
6,350,063 B1 2/2002 Gilliland et al.
6,579,014 B2 6/2003 Melton et al.
6,652,156 B2 11/2003 Shinagawa et al.
6,712,523 B2 3/2004 Zimmel
6,918,703 B2 7/2005 Chen et al.
7,090,406 B2 8/2006 Melton et al.
7,113,679 B2 9/2006 Melton et al.
7,244,066 B2 7/2007 Theuerkorn
7,665,901 B2 2/2010 Kewitsch
7,785,015 B2 8/2010 Melton et al.
7,881,576 B2 2/2011 Melton et al.
7,918,609 B2 4/2011 Melton et al.
8,047,726 B2 11/2011 Tamekuni et al.
8,070,367 B2 12/2011 Winberg et al.
8,480,310 B2 7/2013 Kewitsch
8,596,883 B2 12/2013 Taira et al.
8,801,301 B2 8/2014 Bradley et al.
8,870,469 B2 10/2014 Kachmar
9,069,140 B2 6/2015 Park
9,213,147 B2 12/2015 Mitchell et al.
9,256,033 B2 2/2016 Nielson
9,297,976 B2 3/2016 Hill et al.
9,488,788 B2 11/2016 Murray et al.
9,612,407 B2 4/2017 Kobayashi et al.
9,810,861 B2 * 11/2017 Thompson ........... G02B 6/3897
9,921,375 B2 3/2018 Compton et al.
10,215,926 B2 2/2019 Ott
11,009,667 B2 5/2021 Isenhour et al.
11,874,505 B2 * 1/2024 Hu ....................... G02B 6/3883
2002/0181889 A1 12/2002 Ozeki et al.
2003/0063866 A1 4/2003 Melton et al.
2003/0161586 A1 8/2003 Hirabayashi
2004/0223720 A1 11/2004 Melton et al.
2005/0053342 A1 3/2005 Melton et al.
2005/0069264 A1 3/2005 Luther et al.
2006/0045430 A1 * 3/2006 Theuerkorn ......... G02B 6/3831 385/53
2006/0088247 A1 * 4/2006 Tran ..................... G02B 6/3874 385/55
2006/0088248 A1 * 4/2006 Tran ..................... G02B 6/3825 385/55
2006/0193562 A1 * 8/2006 Theuerkorn ......... G02B 6/3888 385/53
2007/0077010 A1 4/2007 Melton et al.
2007/0160327 A1 * 7/2007 Lewallen ............. G02B 6/3817 385/53
2008/0019642 A1 1/2008 Kewitsch
2009/0003772 A1 * 1/2009 Lu ........................ G02B 6/3869 385/60
2009/0041411 A1 2/2009 Melton et al.
2009/0060423 A1 3/2009 Melton et al.
2009/0185779 A1 7/2009 Gurreri et al.
2009/0271126 A1 10/2009 Gurreri et al.
2010/0104243 A1 4/2010 Kewitsch
2011/0085764 A1 4/2011 Greub et al.
2011/0229085 A1 9/2011 Bradley et al.
2011/0280521 A1 11/2011 Kachmar
2012/0057830 A1 3/2012 Taira et al.
2012/0057831 A1 3/2012 Taira et al.
2013/0114931 A1 5/2013 Mitchell et al.
2013/0136401 A1 5/2013 Cooke et al.
2013/0163934 A1 6/2013 Lee et al.
2013/0170797 A1 7/2013 Ott
2014/0064671 A1 3/2014 Barnette et al.
2014/0205241 A1 7/2014 Nielson
2016/0061690 A1 3/2016 Elkins et al.
2016/0139345 A1 5/2016 Nielson
2016/0209599 A1 * 7/2016 Van Baelen ......... G02B 6/3831
2016/0324402 A1 11/2016 Yajima
2017/0160476 A1 6/2017 Beier et al.
2017/0160478 A1 * 6/2017 Beier ................... G02B 6/3874
2017/0235060 A1 * 8/2017 Coenegracht ........ G02B 6/3825 385/60
2017/0254962 A1 9/2017 Mueller-Schlomka et al.
2017/0261696 A1 9/2017 Compton et al.
2017/0261698 A1 9/2017 Compton et al.
2017/0261699 A1 * 9/2017 Compton ............. G02B 6/4477
2018/0372962 A1 12/2018 Isenhour et al.
2019/0011641 A1 1/2019 Isenhour et al.
2019/0041584 A1 * 2/2019 Coenegracht ........ G02B 6/3825
2019/0094460 A1 3/2019 Brusberg et al.
2019/0235174 A1 8/2019 Ott
2019/0339460 A1 11/2019 Dannoux et al.
2019/0339461 A1 11/2019 Dannoux et al.
2019/0391342 A1 12/2019 Wilson et al.
2020/0064561 A1 * 2/2020 Alrutz .................. G02B 6/3891
2020/0073067 A1 3/2020 Lohse et al.
2021/0132300 A1 * 5/2021 Isenhour .............. G02B 6/3875

FOREIGN PATENT DOCUMENTS

JP 2013-218103 A 10/2013
WO 2013/173273 A1 11/2013
WO 2014/133837 A1 9/2014
WO 2017/155754 A1 9/2017
WO 2017/156385 A1 9/2017
WO 2017/156387 A1 9/2017

* cited by examiner

FIBER OPTIC RECEPTACLE HAVING AN ALIGNMENT ASSEMBLY

RELATED APPLICATIONS

This application claims the benefit of priority under U.S. Provisional Application Ser. No. 63/310,479 filed on Feb. 15, 2022, the content of which is relied upon and incorporated herein by reference in its entirety.

BACKGROUND

The present disclosure relates generally to fiber optic receptacles for interconnecting optical fibers within a communications network.

Fiber optic networks have revolutionized the telecommunications industry, in part, because of the high bandwidth carrying capacity, low signal degradation, and low power usage of fiber optic networks. As a result, fiber optic networks have been created and expanded to deliver "fiber-to-the-curb" (FTTC), "fiber-to-the-business" (FTTB), "fiber-to-the-home" (FTTH), "fiber-to-the-premises" (FTTP) and "fiber-to-the-subscriber" (FTTS). Together, each of these are referred to generically as "FTTx." In order to provide services to one of these subscriber locations, fiber optic networks must include a large number of interconnection points in which optical fibers are optically connected or mated in the field. In the most recently developed fiber optic networks, communications service providers are demanding factory-prepared interconnection solutions, commonly referred to as "plug-and-play" systems, that are robust enough for use in field applications. Plug-and-play systems allow less skilled field technicians to readily perform optical interconnections, thereby reducing field labor costs and the time required to install and activate optical networks.

Factory-prepared interconnection solutions should not only properly align mating optical fibers, but should also protect the mating optical fibers against adverse environmental and mechanical influences, such as from moisture intrusion and tensile forces, and more particularly, protect the receptacle assembly (i.e., alignment assembly, etc.) at which the optical fibers are interconnected. Conventional fiber optic receptacles include a receptacle housing defining an internal cavity that houses an alignment assembly for aligning opposing optical connectors or opposing ferrules. The alignment assembly is typically inserted from the front-side of the receptacle and is designed to receive a pair of ferrules, each of which is mounted upon the end portions of one or more optical fibers. The alignment assembly assists in gross alignment of the ferrules, and ferrule guide pins or other alignment means assist in detailed alignment of the optical fibers positioned on the end faces of the opposing ferrules. One of the ferrules is attached to the ends of one or more optical fibers extending from a cable, ribbon or optical fiber device and routed to the back-side of the receptacle, such as from the interior of a conventional optical connection terminal or closure. The other ferrule is mounted one or more optical fibers terminating in a fiber optic plug that is routed to the front-side of the receptacle, for example a connectorized drop cable leading to a subscriber of the optical network.

In the process of mating the opposing ferules within the receptacle, the plug ferrule is inserted into one end of the alignment assembly. Original receptacle designs required that the plug ferrule be retained within the alignment assembly by mechanical coupling, such as by means of a pair of latches. While the latches effectively secure the plug ferrule within the alignment assembly, mechanical coupling disadvantageously limits float between the plug ferrule and the alignment assembly. Recent receptacle designs include a biasing member, for example one or more linear springs, for providing float. In testing these receptacle designs, it has been determined that the biasing springs are subject to deformation during loading and ferrule insertion. To prevent this, structural design changes are needed to control spring travel and thereby prevent buckling. A new design is also needed to facilitate assembly by allowing for a "loose" fit between the biasing springs and the guide structures, and between the biasing springs and the bores into which the biasing springs are inserted. A receptacle design that controls spring travel, prevents buckling and provides for a loose fit would prevent damage to the biasing springs during assembly and use.

A possible advantage associated with existing receptacle designs is that they allow access to the alignment assembly and the back-side (i.e., internal) ferrule from the outside of the connection terminal or enclosure without entering the connection terminal or closure, referred to herein as "external access." To accomplish this, the receptacle is designed in two pieces as viewed from the front-side (i.e., external) side of the receptacle with the alignment assembly held within the receptacle housing (first piece) by a second piece that is attached to the first piece and removable from outside the connection terminal or closure. An example of such an external two-piece design is the fiber optic receptacle described and shown in U.S. Pat. No. 6,579,014 entitled, Fiber Optic Receptacle. However, such an external two-piece design requires an extra seal between the first piece and the second piece to prevent water ingress. Furthermore, the seal must be sufficiently strong to prevent connector failure due to freeze/thaw cycling that causes the second piece to separate from the first piece. In addition, an external two-piece design requires strict control and maintenance of high-quality molded surfaces. As previously mentioned, the external two-piece design provides a field technician with access to the alignment assembly and the back-side ferrule. Accordingly, while it is advantageous to eliminate the external two-piece design and extra seal, an external one-piece design also eliminates the ability to access the alignment assembly and back-side ferrule from the front-side of the receptacle. However, an external one-piece design permits the receptacle assembly to pass freeze/thaw cycle testing and provides further improvements with respect to ferrule and optical fiber alignment, which is especially important when mating angled physical contact (APC) connectors for low-loss requirements.

BRIEF SUMMARY

To achieve the foregoing, and in accordance with the purposes as embodied and broadly described herein, the present disclosure provides various embodiments of a fiber optic receptacle assembly, and more particularly, a fiber optic receptacle having improved alignment. Thus, the present disclosure provides a fiber optic receptacle designed to readily align and mate any like pair of opposing optical connectors or ferrules in a precise and secure manner, while providing strain relief against pulling forces of up to about 600 lb/ft.

According to one aspect, a fiber optic receptacle includes a receptacle housing defining an external end, an internal end and an internal cavity for housing an alignment assembly operable for interconnecting like optical connectors or ferrules. The receptacle housing permits insertion and removal of the alignment assembly from the internal end, or back-side, of the housing only, thus eliminating removal of the alignment assembly from the external end, or front-side, of the receptacle. The alignment assembly is retained within the internal cavity via a retainer that is secured to the internal end of the receptacle housing. The alignment assembly is removed from the internal cavity by completely removing the retainer.

According to another aspect, a fiber optic receptacle including a receptacle housing, a retainer and an alignment assembly for receiving and aligning like optical connectors or ferrules. The receptacle housing permits the alignment assembly to be inserted and removed from the back-side of the receptacle only, as compared to a conventional external two-piece design in which the alignment assembly is removed from the front-side of the receptacle to permit access to the alignment assembly and the back-side ferrule. The fiber optic receptacle may be secured within a wall of an enclosure or may be used as a stand-alone receptacle assembly. The alignment assembly defines a lengthwise, longitudinally extending passageway opening through opposing first and second ends that is adapted to receive a plug ferrule contained or partially contained within a first fiber optic connector and a second end adapted to receive a back-side ferrule contained or partially contained within a second fiber optic connector. The receptacle housing includes opposing external and internal ends, wherein the external end is adapted to receive the plug ferrule and the internal end is adapted to receive the alignment assembly and the back-side ferrule. A retainer adjacent the internal end of the receptacle housing floatingly retains the alignment assembly within an internal cavity of the receptacle. The retainer and the receptacle housing define tapered biasing member supports for supporting one or more linear biasing springs that operably engage the alignment assembly so as to urge the alignment assembly towards the external end of the receptacle housing. The alignment assembly defines a chamfer on its second end as a means for guiding the back-side ferrule into the alignment assembly. The retainer defines a plurality of internal alignment tangs that provide a loose fit for facilitating alignment of the back-side ferrule and the plug ferrule within the alignment assembly.

Typically, the fiber optic receptacle provides strain relief to an optical connection terminal or closure so that one or more optical fibers of a fiber optic cable may be aligned and optically interconnected with one or more optical fibers routed to the receptacle from within the connection terminal or closure. In one embodiment, the fiber optic receptacle includes a receptacle housing having an internal end and an external end, and an alignment assembly that is biased towards the external end of the housing. The alignment assembly is biased so that when a fiber optic plug ferrule is inserted into the external end of the receptacle housing, the end face of the plug ferrule maintains physical contact with the end face of a back-side ferrule positioned within the alignment assembly without requiring the plug ferrule to be latched to the alignment assembly, thereby providing float between the respective ferrules. According to a further embodiment, a universal fiber optic receptacle is provided wherein an internal cavity defined by the receptacle housing and the associated retainer is sized to receive any alignment assembly or optical connector, such as for example, alignment assemblies configured to receive and align a plurality of types of optical connectors or ferrules including MTP, MTRJ, SC-DC, SC, DC, LC, and the like.

BRIEF DESCRIPTION OF THE DRAWINGS

These and other features, aspects and advantages disclosed herein are better understood when the following detailed description is read with reference to the accompanying drawings, in which.

DETAILED DESCRIPTION

Figure 1:
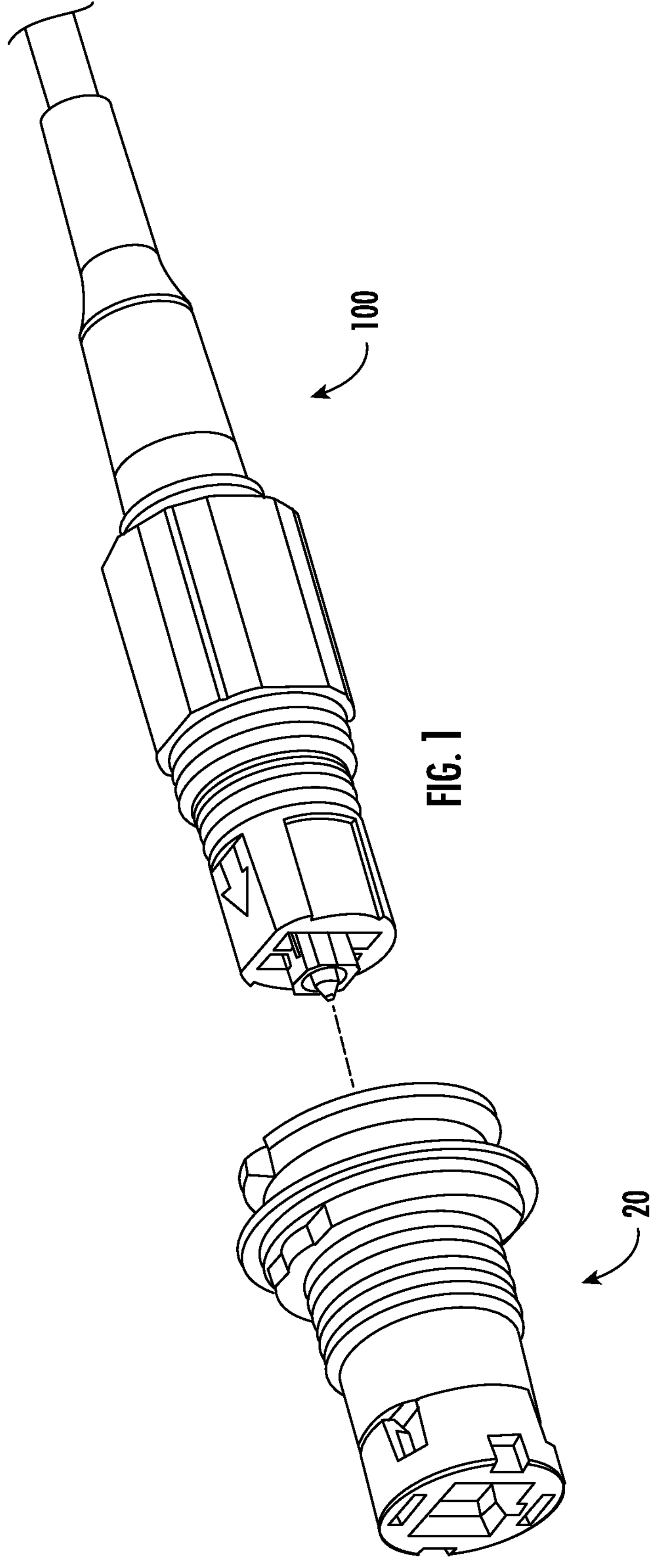
FIG. 1 is an assembled view of a fiber optic receptacle in accordance with exemplary embodiments disclosed herein in substantial alignment with a fiber optic connector.

The embodiments will now be described more fully hereinafter with reference to the accompanying drawings. However, each embodiment may be shown in many different forms and should not be construed as limited to the embodiments set forth herein. These exemplary embodiments are provided so that this disclosure will be both thorough and complete, and will fully convey the scope of the invention to those skilled in the art. Like reference numbers may refer to like elements throughout the various drawings.

The various embodiments described below provide a fiber optic receptacle having a design that eliminates the need for an internal seal, while permitting access to an alignment assembly from the back-side of the receptacle. The design is an improvement over prior designs that permit the receptacle assembly to pass freeze/thaw cycle testing. The design also provides further improvements with respect to ferrule and optical fiber alignment, which is especially important when mating angled physical contact (APC) connectors for low-loss requirements. Embodiments of the fiber optic receptacle further provide an improved retainer and an improved alignment assembly. Thus, each embodiment provides a fiber optic receptacle designed to readily align and mate any like pair of opposing optical connectors or ferrules in a precise and sealed manner, while providing strain relief against pulling forces of up to about 600 lb/ft.

The fiber optic receptacle interconnects optical fibers within a communications network. The receptacle is designed such that it may be mounted within an optical connection terminal, closure or similar enclosure defining an opening or port in a wall through which one or more optical fibers are routed. The receptacle may also be mounted within an optical connection terminal, closure, pedestal, network interface device or like enclosure. In other embodiments, because of the robust (i.e., rugged) nature of its structure, the receptacle may be used in buried network installations. The fiber optic receptacle may also be used as a generic receptacle assembly and need not be mounted within any wall of any enclosure. If mounted within a wall, however, a rigid shoulder of the receptacle housing and a coupling nut secure the receptacle to the wall, thus providing superior strain relief for tensile forces, up to about 600 lb/ft, as compared to conventional receptacle assemblies.

In the exemplary embodiments shown and described herein, the fiber optic receptacle is adapted to receive a corresponding fiber optic plug having a plug ferrule mounted upon the end of a fiber optic cable comprising one or more optical fibers for optically connecting one or more optical fibers of a corresponding ferrule on the back-side of the receptacle (i.e., back-side ferrule). As used herein, the fiber optic cable associated with the fiber optic plug is referred to as a "drop cable" and is intended to include all types of fiber optic cables such as, but not limited to, a branch cable, a distribution cable, an extended distribution cable, a flat dielectric drop cable, a figure-eight drop cable or an armored drop cable. The drop cable typically comprises between one and about twelve optical fibers, depending on the type of cable and the number and type of optical connectors. The particular components of the fiber optic receptacle and fiber optic plug described herein may be modified to accommodate different cable types and optical connectors. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals.

Each fiber optic receptacle embodiment provides a design that prevents moisture and contaminates from reaching the end faces of the plug ferrule and back-side ferrule. In all embodiments in which the receptacle is mounted in an opening or port within a wall, a sealing gasket provides a seal between the internal and external environments defined by the wall. Generally speaking, most of the components of the fiber optic receptacle and fiber optic plug are formed from a suitable polymer. Preferably, the polymer is a UV stabilized polymer. However, other suitable materials made also be used. For example, stainless steel or any other suitable metal may be used for various components of the receptacle and/or plug.

Figure 2:
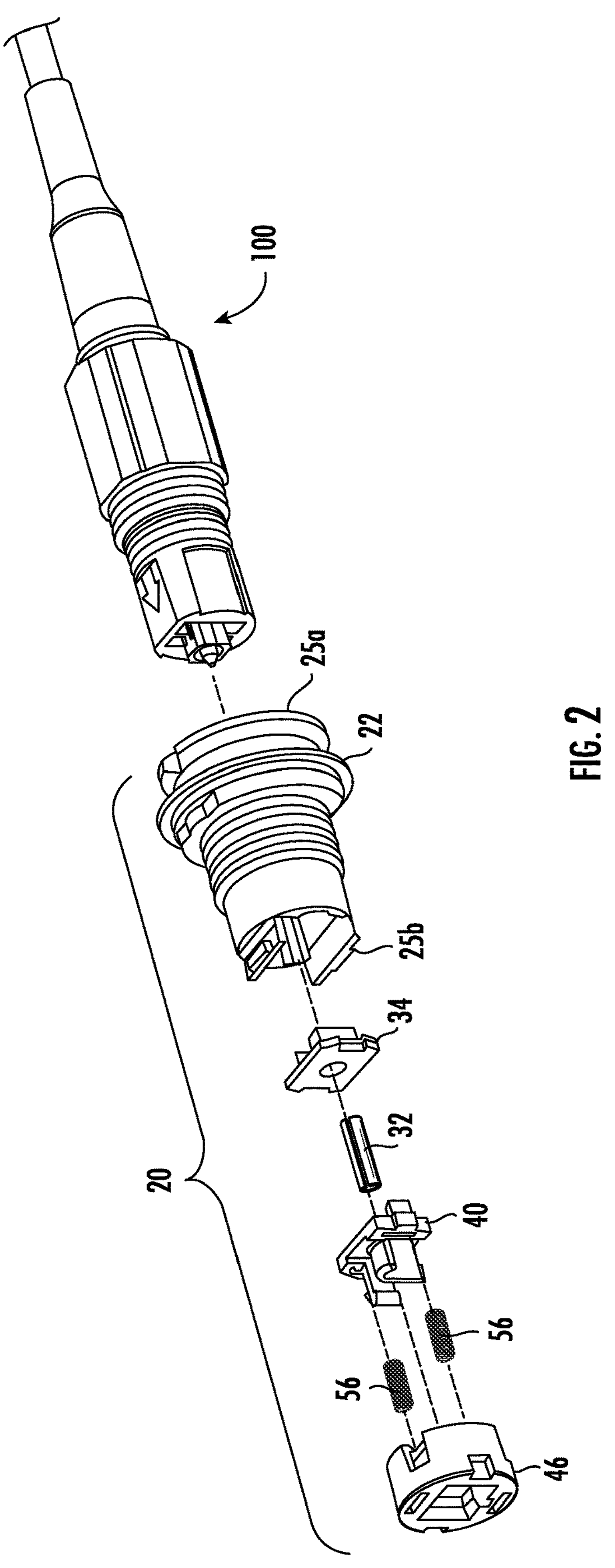
FIG. 2 is an exploded view of the fiber optic receptacle shown in FIG. 1 in accordance with exemplary embodiments disclosed herein in substantial alignment with the fiber optic connector shown in FIG. 1.
Figure 3:
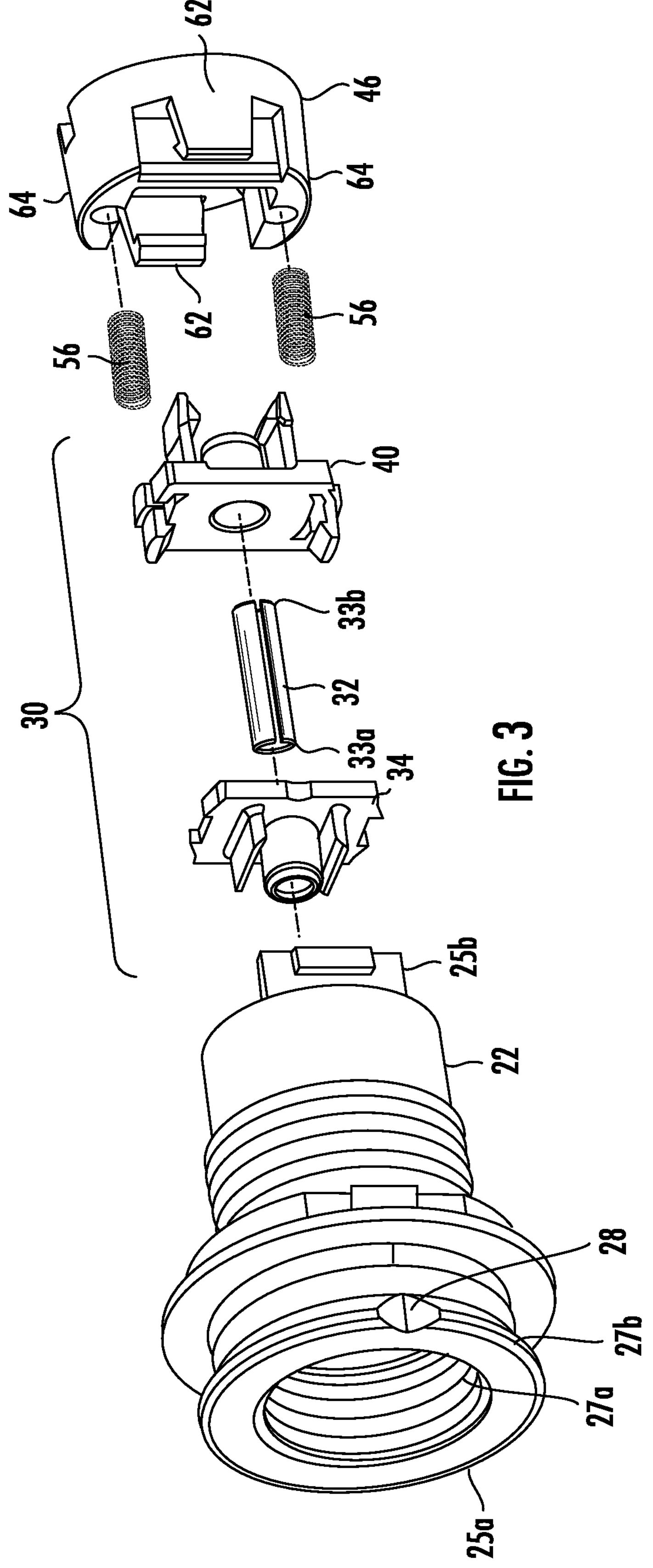
FIG. 3 is an exploded view of the fiber optic receptacle shown in FIG. 1 in accordance with exemplary embodiments disclosed herein.

Referring now to FIGS. 1-3, a fiber optic receptacle 20 in accordance with exemplary embodiments disclosed herein is shown. FIGS. 2-3 show the fiber optic receptacle 20 in an exploded or disassembled configuration, while FIG. 1 shows the fiber optic receptacle 20 in an assembled configuration. The receptacle 20 is preferably mounted within an opening or port in a wall of an enclosure (not shown) to connect optical fibers from outside the enclosure with optical fibers from within the enclosure. FIG. 1 further illustrates how the fiber optic receptacle may be aligned with a fiber optic connector 100. However, the fiber optic receptacle 20 may be designed to accommodate and mate with any type of fiber optic connector having a fiber optic plug that is mounted upon the end portion of a fiber optic cable.

As shown, particularly with reference to FIGS. 2-3, the receptacle 20 includes a receptacle housing 22 defining an internal cavity 24 opening through opposing ends. The opposing ends include a first, or external end 25*a* and a second, or internal end 25*b*. Typically, the opening through the external end is sized to accommodate a corresponding fiber optic connector, having a fiber optic plug. The external end also includes threads 27*a*, 27*b*1, 27B2, and a notch 28, which facilitate connection to elements on a connector and/or other components. In preferred embodiments, the relatively large opening of the external end allows the alignment assembly and the end face of a back-side ferrule to be cleaned with a cleaning tool, such as a cotton swap (e.g., Q-tip) or similar device. This is advantageous since the receptacle, in contrast to the fiber optic plug, may be exposed to adverse environmental conditions and possibly accumulate contaminants while not being used for a prolonged period of time. The various embodiments shown and described herein allow for easy cleaning and improved access without disassembly. In addition, the external end 25*a* of the receptacle 20 may be fitted with a dummy plug or dust cap when not in use to reduce the possibility of accumulating contaminants within the internal cavity 24.

As shown particularly in FIGS. 4, 5A, 5B, 6, 7, 8A-8D, and 9A-9D, the alignment assembly 30 includes two alignment supports 34 (a proximal alignment support), 40 (a distal alignment support), and include elements that extend outwardly from opposing sides. While the supports 34, 40 can include flexible support features, each support is also used for aligning the alignment assembly 30 within the internal cavity 24 of the receptacle housing 22. The supports 34, 40 extend such that they seat within guide channels defined within the internal cavity 24 of the receptacle housing 22. The receptacle housing 22 is preferably sized to define one or more guides extending lengthwise therethrough. Thus, the first end of the alignment assembly 30 can be positioned within the receptacle housing 22. In addition, the supports 34, 40 provide "keying" and "guiding" functions that prevent the alignment assembly 30 from being improperly loaded into the receptacle housing 22. The supports 34, 40 further aid in preventing the alignment assembly 30 from being withdrawn through the opening defined by the retainer 46.

Figure 4:
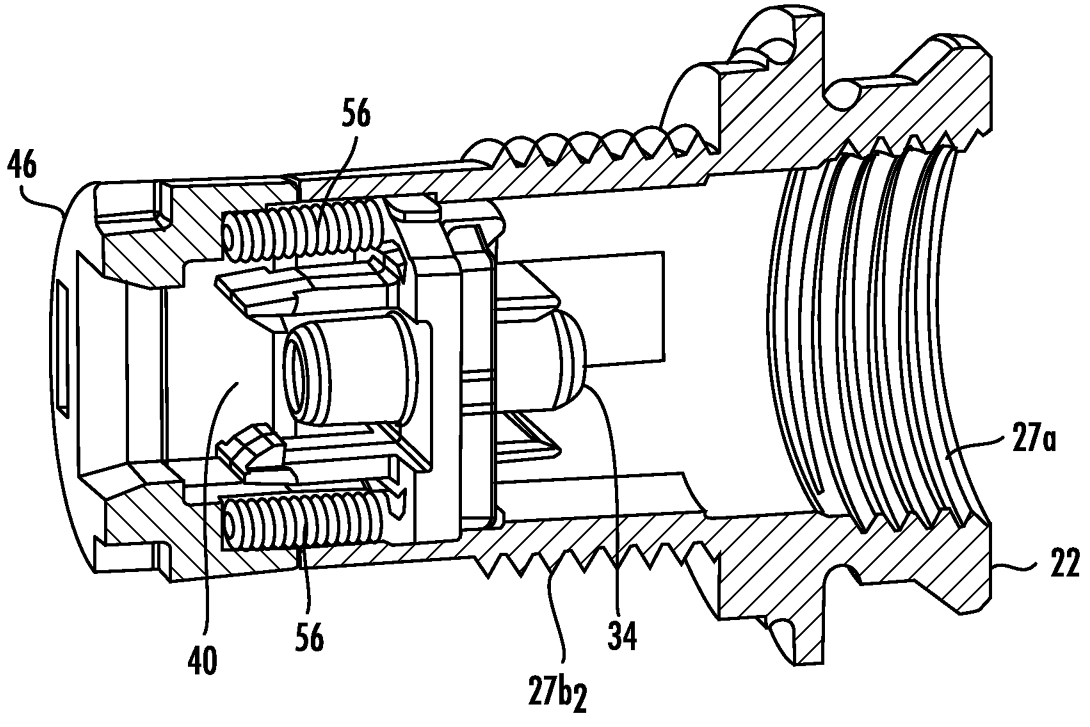
FIGS. 4, 5A, and 5B are cross-sectional views of the fiber optic receptacle shown in FIG. 1.
Figure 5A:
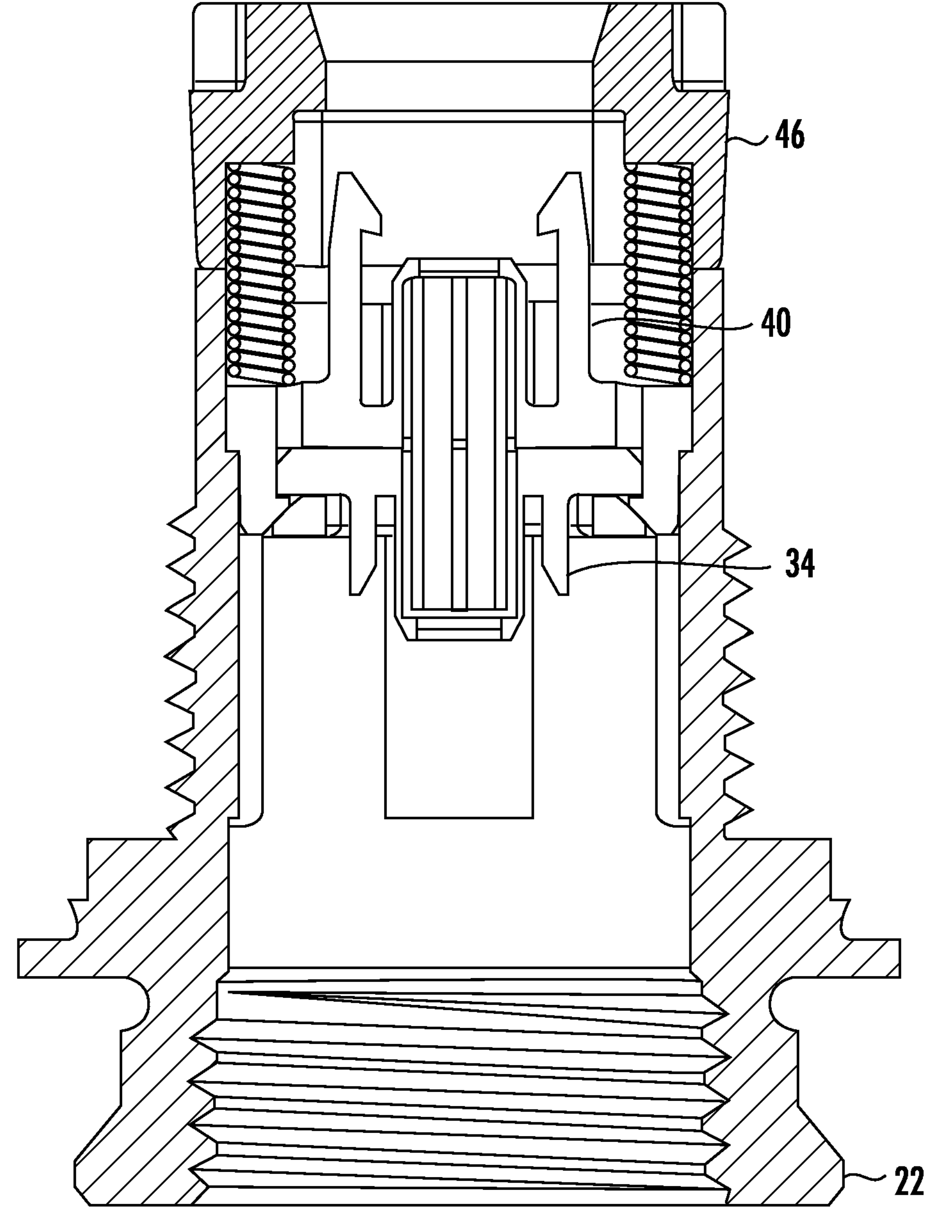
Figure 5B:
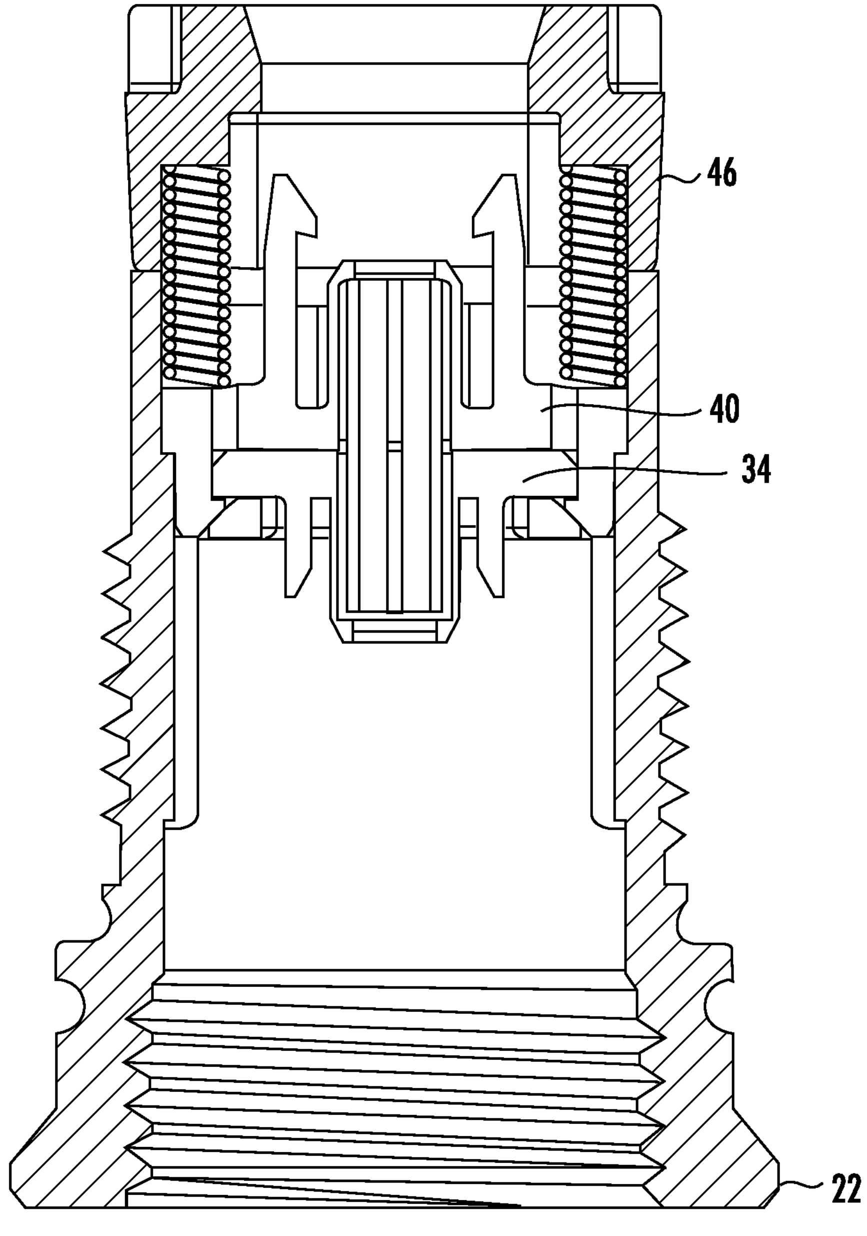

The distal alignment support 40 is configured for engagement with the retainer 46, while the proximal alignment support 34 is configured for engagement with the receptacle housing 22, as shown particularly with respect to FIGS. 4, 5A, and 5B. Referring particularly to FIGS. 6-8B, the alignment assembly 30 includes an alignment sleeve 32, the proximal alignment support 34, and the distal alignment support 40. The alignment sleeve 32 is preferably tube-shaped with at least one longitudinally extending slot 31 extending fully between the sleeve ends 33*a*, 33*b* and in a snap-fit engagement with the alignment supports. The alignment sleeve 32 is preferably manufactured from a ceramic material or one or more materials that have similar properties. The proximal alignment support 34 includes a support base 35 with cut-outs 36, a sleeve retainer member 37, which is cantilevered. The sleeve retainer member 37 is preferably integrally coupled to the support base 35 and a thru-hole HP extends through the support base 35 to the retainer member end 38. The proximal alignment support 34 additionally includes keying and guiding members 42, 44 that further facilitate engagement with the retainer 46 and the distal alignment support 40. Each keying and guiding member preferably includes a tang element 42*t*, 44*t* that engages with a corresponding opening or cutout in a coupling member. As shown The distal alignment support 40 includes a support base 41 having a plurality of cutouts disposed therein 42, and a sleeve retainer member 43, which is also cantilevered and integrally coupled to the support base 41. The sleeve retainer member 43 also includes a thru-hole HD that extends through the support base 41 to the retainer member end 45.

When fully assembled, the alignment assembly forms a longitudinally extending passageway. The alignment assembly 30 is further configured to receive and align with a back-side ferrule mounted upon the ends of one or more optical fibers routed to the receptacle 20 from inside the wall of the enclosure with a plug ferrule of a fiber optic plug mounted upon the ends of one or more optical fibers of a fiber optic cable. In this regard, the plug ferrule of the fiber optic plug is insertable through the external end of the receptacle 20 into the opening defined by the first end of the alignment assembly 30, while the back-side ferrule is inserted through the internal end of the receptacle 20 into the opening defined by the second end of the alignment assembly 30.

The receptacle housing 22 may be sized and shaped in any suitable manner. In the embodiments shown, the receptacle housing 22 comprises a cylindrical portion defining the internal cavity 24 and a flanged portion 26 located medially along the length of the housing 22, preferably nearer to the external end. The flanged portion 26 extends radially outward from the receptacle housing 22 and may define a generally flat surface for receiving a sealing member. A generally flat elastomeric gasket or conventional O-ring may also be disposed between the surface and the exterior surface of the wall in order to provide a seal against any adverse environmental conditions. The receptacle housing 22 is secured to the wall using an internally threaded coupling nut (not shown) that is threaded onto an externally threaded surface provided on the receptacle housing 22. As the coupling nut is tightened, the receptacle housing 22 is pulled towards the exterior surface of the wall, thus compressing the gasket and providing an effective seal.

The fiber optic receptacle 20 further includes a retainer 46 that is secured to the receptacle housing 22 adjacent the internal end of the housing 22. The retainer 46 may be secured to the receptacle housing 22 in any suitable manner. In the embodiments shown, the retainer 46 defines a plurality of retaining clips that engage corresponding slots defined by the receptacle housing 22. As such, the retainer 46 is securely retained within the receptacle housing 22. The retainer 46 secures the alignment assembly 30 within the receptacle housing 22 once the retaining clips of the retainer engage the slots of the receptacle housing 22.

By inserting the alignment assembly 30 from the internal end, or back-side, of the receptacle housing 22 and retaining it in place with the retainer 46, the alignment assembly 30 may be removed from only the internal, or back-side, of the receptacle 20. In embodiments in which the receptacle 20 is secured within a wall of an enclosure, the alignment assembly 30 may only be accessed only from the internal, or back-side, of the receptacle 20. In contrast, conventional receptacles include an external two-piece design that permits the alignment assembly 30 to be removed from the external, or front-side, of the receptacle 20. In such a design, a field technician is able to remove the alignment assembly 30 by removing an external second piece of the receptacle housing 22 to gain access to the alignment assembly 30 from outside the enclosure without the need to enter the enclosure. Multi-piece designs may also require a seal between the first piece and the second piece of the receptacle housing 22 to prevent water ingress. In the present embodiments, the design eliminates the need for an inner seal. Furthermore, freeze/thaw cycling will not cause the second piece to pull away or separate from the first piece and expose the optical fibers from inside the enclosure and the back-side ferrule to adverse environmental conditions, such as water ingress and dust, dirt and insect intrusion.

As shown particularly in FIGS. 2 and 3, the retainer 46 engages the receptacle housing 22 so as to retain the alignment assembly 30 within the receptacle housing 22. The retainer 46 defines an opening large enough to permit the back-side ferrule (not shown) that is mounted upon the ends of the optical fibers originating from inside the enclosure to pass through the retainer 46 into the alignment assembly 30. At the same time, the opening is small enough to not permit the alignment assembly 30 to be removed without removing the retainer 46 from the receptacle housing 22. Once assembled, the retainer 46 must be removed from the receptacle housing 22 in order to access the alignment assembly 30 or to access the back-side ferrule (not shown), such as for cleaning, replacement or the like. In an alternative embodiment, the retainer 46 may comprise threads that engage corresponding threads on the receptacle housing 22 to retain, access and remove the alignment assembly 30 from the receptacle housing 22. Once the alignment assembly 30 or the back-side ferrule has been cleaned, repaired or replaced, the alignment assembly 30 is inserted into the internal cavity 24 defined by the receptacle housing 22 and the retainer 46 is secured to the receptacle housing 22.

The fiber optic receptacle 20 can further include at least one biasing member disposed within the receptacle housing 22. In the embodiments shown, the biasing member comprises a pair of linear coil springs 56, preferably having a low spring constant (k), that operably engage the alignment assembly 30 to urge the alignment assembly 30 toward the external end of the receptacle housing 22 such that the alignment assembly 30 is spring-loaded. However, the at least one biasing member may be any component, structure or material that biases the alignment assembly 30 in the direction of the external end of the receptacle housing 22. The springs 56 are positioned between the supports 34, 40 adjacent the first end of the alignment assembly 30 and the retainer 46 and are supported by posts, as shown and described in greater detail below. In addition to the spring-loading of the alignment assembly 30, the plug ferrule of the fiber optic plug that is inserted into the alignment assembly 30 through the external end if the receptacle housing 22 is also typically spring-loaded. Thus, the spring-loading of the alignment assembly 30 and the plug ferrule urges the end face of the plug ferrule against the end face of the backside ferrule within the alignment assembly 30. In contrast to conventional alignment assemblies, connector sleeves or adapter sleeves for coupling ferrules, the alignment assembly 30 need not include latches to mechanically engage the plug ferrule since the spring-loading will bias the alignment assembly 30 into engagement with the plug ferrule within the receptacle housing 22. However, the second end of the alignment assembly 30 preferably includes a means for engaging the back-side ferrule, such as, for example, a latch mechanism that includes one or more latches. Thus, a alignment assembly 30 according to an embodiment is also provided that may also be utilized in situations that do not involve a fiber optic receptacle 20. In alternative embodiments, the fiber optic receptacle 20 may include other types of biasing members, in addition to or instead of one or more springs 56.

Referring to FIGS. 3 and 4, a cross-sectional view of the assembled fiber optic receptacle of FIG. 2 is shown in FIG. 3, and a cross-sectional view of the assembled fiber optic receptacle of FIG. 2. The external end of the receptacle housing 22 is internally threaded so as to threadably engage an externally threaded fiber optic plug (not shown). In preferred embodiments, the alignment assembly 30 is received through the internal end of the receptacle housing 22 and is retained within the internal cavity 24 by the retainer 46. The alignment assembly 30 may be shaped and designed to accommodate and mate with a variety of different types of fiber optic connectors mounted upon the end of a fiber optic cable. As shown, the alignment assembly 30 defines a lengthwise extending passageway opening through the opposing first end and second end for receiving and aligning the ferrules of the fiber optic connectors. A first fiber optic connector (not shown) including a plug ferrule is inserted into the first end of the alignment assembly 30. A second fiber optic connector (not shown) including a back-side ferrule that is mounted upon the ends of one or more optical fibers originating from inside the enclosure is inserted through the opening defined by the second end of the alignment assembly 30. The alignment assembly 30 preferably defines an alignment slot 31 for receiving a retaining clip (not shown) of the second fiber optic connector. The slot 31 is also configured as a keying feature used to align the second fiber optic connector within the alignment assembly 30 and the retaining clip is used to plug/unplug the second fiber optic connector. The alignment assembly 30 can further include an interior chamfer for guiding the second fiber optic connector into the alignment assembly 30. The chamfer can help to protect the end face of the ferrule of the second fiber optic connector by guiding the connector housing during insertion into the alignment assembly 30.

Referring particularly to FIG. 3, in the embodiments of the fiber optic receptacle 20 in which the biasing member includes one or more springs 56, the retainer 46 includes one or more tapered posts 62 extending in a lengthwise direction from the retainer 46 toward the internal end of the receptacle housing 22. The tapered posts 62 serve as supporting structures for the springs 56. The retainer 46 includes the same number of posts 62 as the number of springs 56 such that each spring can be mounted upon a respective post. In addition, each spring 56 is preferably longer than the respective post 62, even in the spring's compressed state. As such, the posts 62 serve to position the springs 56 that, in turn, bias the alignment assembly 30 and, more particularly, spring posts 64 of the supports 52 of the alignment assembly 30. The spring posts 64 of the supports 52 are aligned with the posts 62 of the retainer 46. Thus, each spring 56 contacts a respective biasing member support 52 of the alignment assembly 30 and urges the alignment assembly 30 toward the external end of the receptacle housing 22. The spring posts 64 of the supports 52 are preferably tapered, and more preferably, conical in shape. Both sets of posts 62, 64 are preferably tapered in order to capture the springs 56 during assembly, thus facilitating loading and positioning the springs 56 between the alignment assembly 30 and the retainer 46. In other words, the tapered shape provides a feeding mechanism for seating springs 56 properly. Because the springs 56 have a low spring constant (k), they are subject to bowing, and even buckling, during assembly. Thus, improper spring seating may result in poor or uneven biasing of the alignment assembly 30. The tapered shape of the posts 62, 64 provides proper spring 56 seating and eliminates assembly errors.

Figure 6:
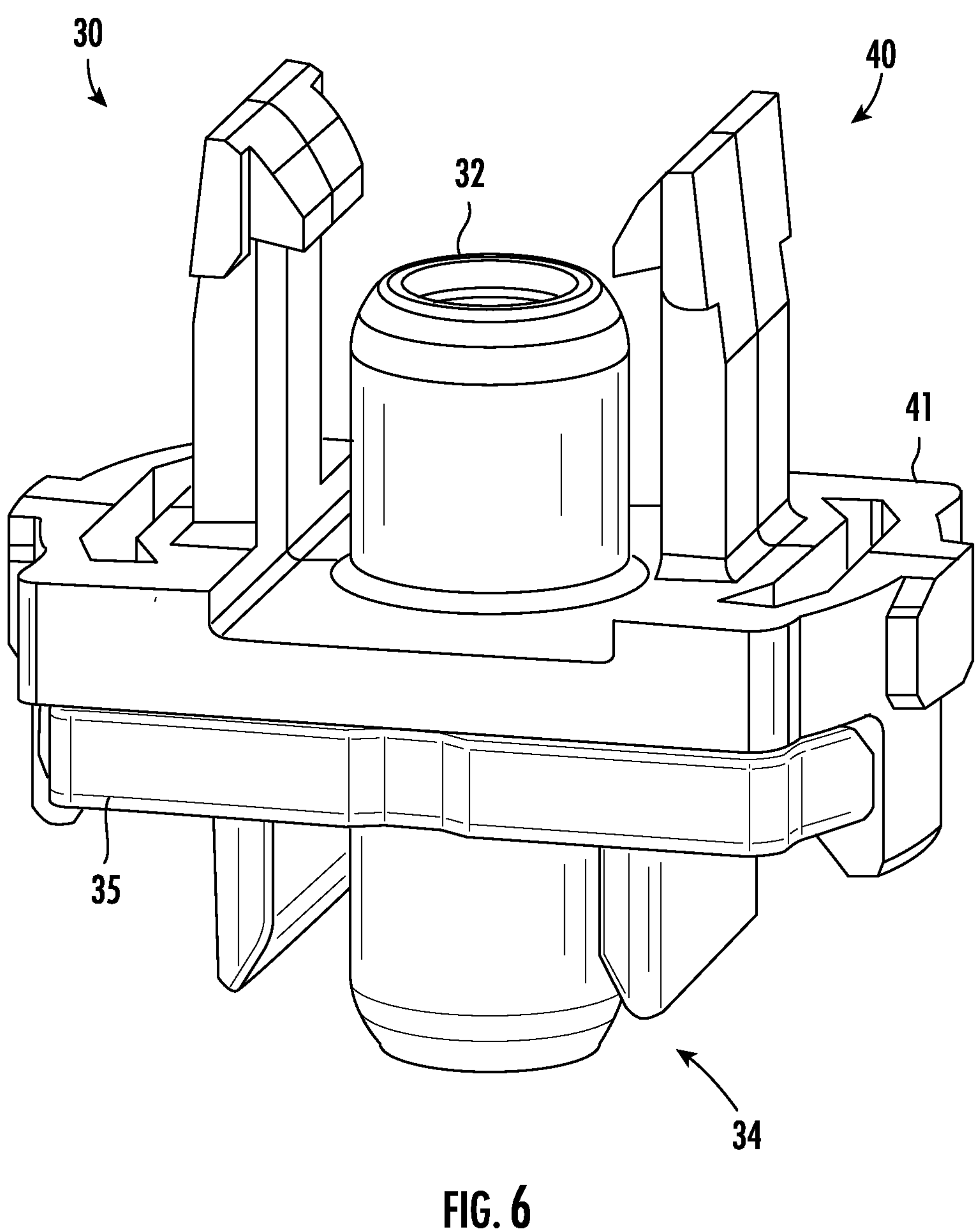
FIG. 6 is an assembled view of an alignment assembly included of the fiber optic receptacle of FIG. 1.
Figure 7:
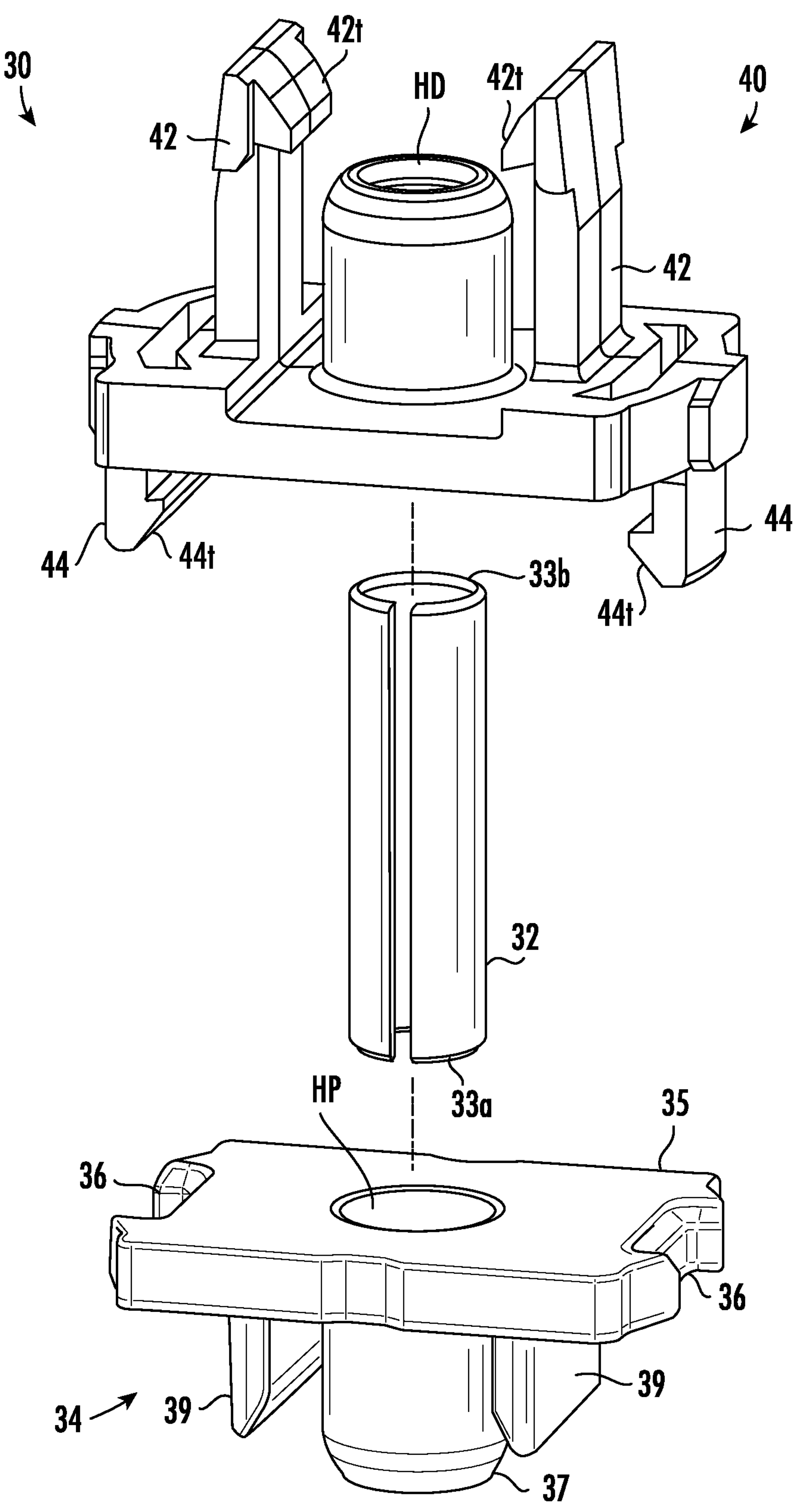
FIG. 7 is an exploded view of an alignment assembly shown in FIG. 6.
Figure 8A:
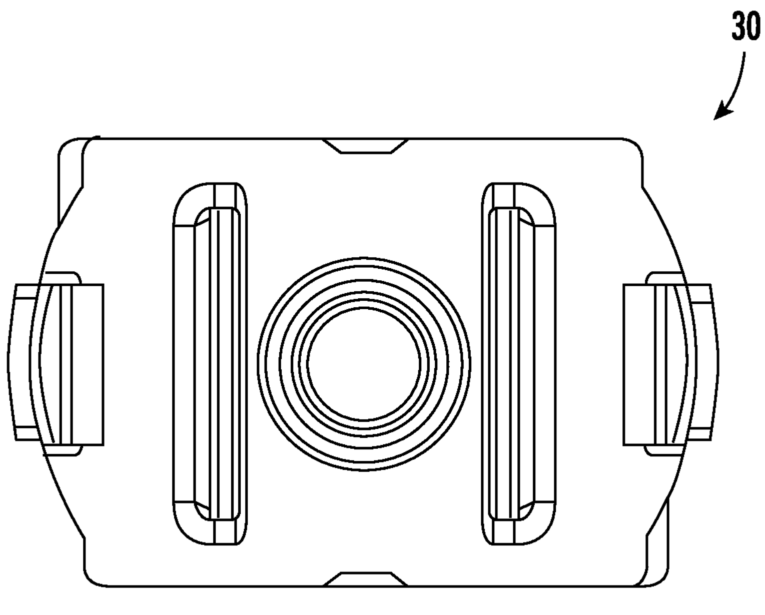
FIG. 8A is a top view of the alignment assembly shown in FIG. 6.
Figure 8B:
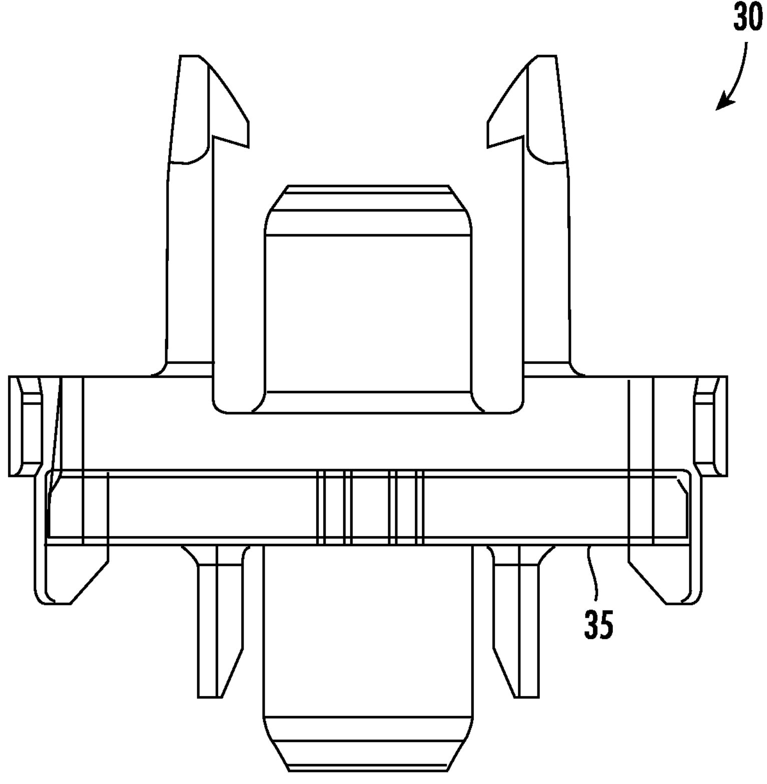
FIG. 8B is a side view of the alignment assembly shown in FIG. 6.
Figure 8C:
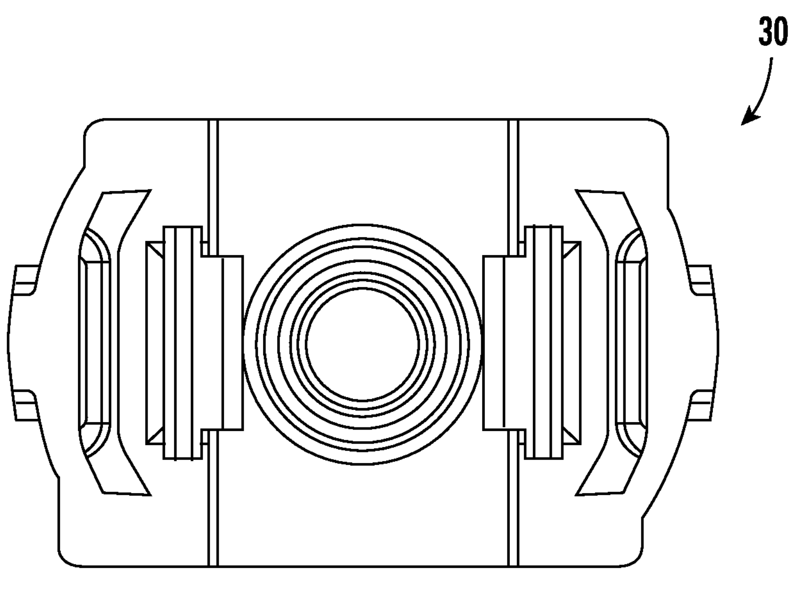
FIG. 8C is a bottom view of the alignment assembly shown in FIG. 6.
Figure 8D:
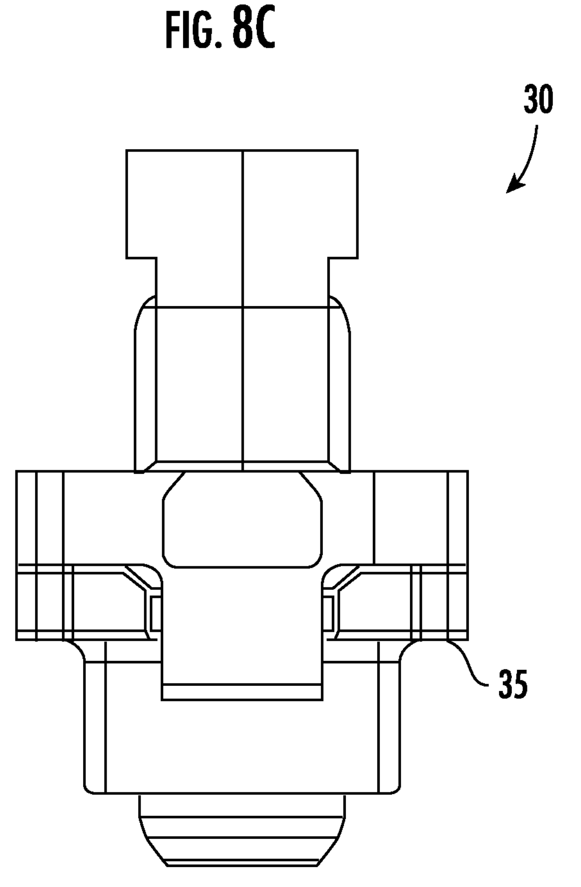
FIG. 8D is another side view of the alignment assembly shown in FIG. 6.
Figure 9A:
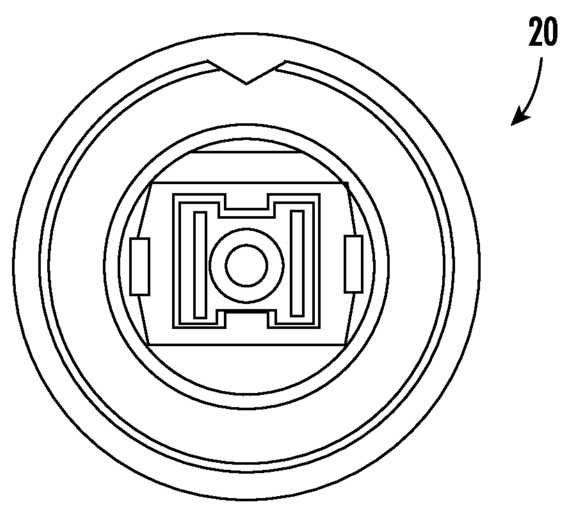
FIG. 9A is a top view of an assembled fiber optic receptacle.
Figure 9B:
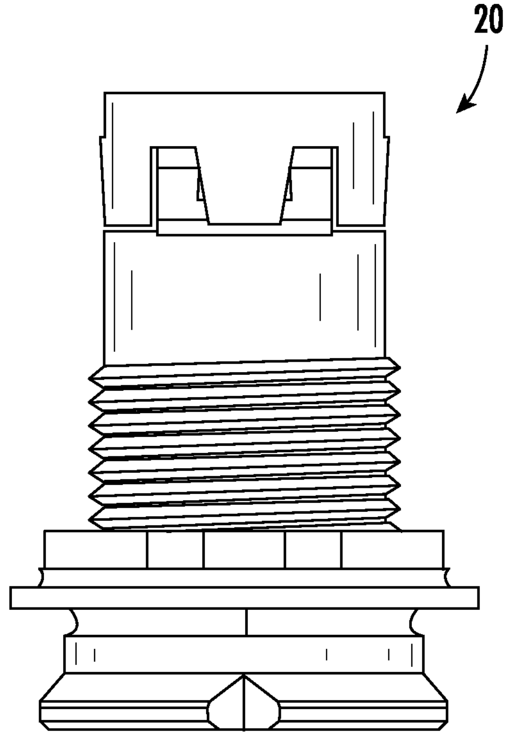
FIG. 9B is a side view of the assembled fiber optic receptacle shown in FIG. 9A.
Figure 9C:
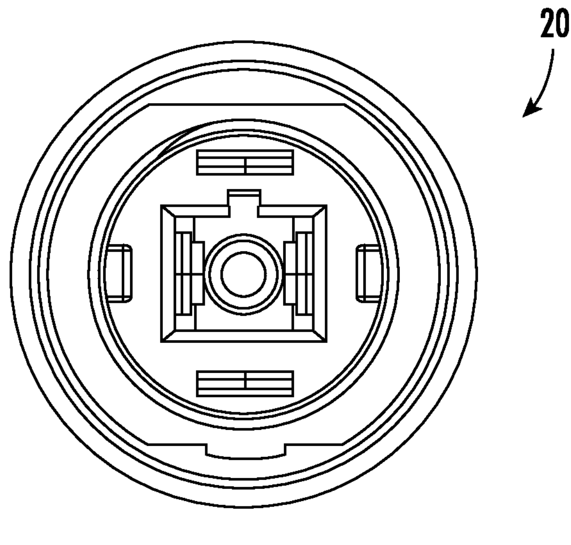
FIG. 9C is a bottom view of the assembled fiber optic receptacle shown in FIG. 9A.
Figure 9D:
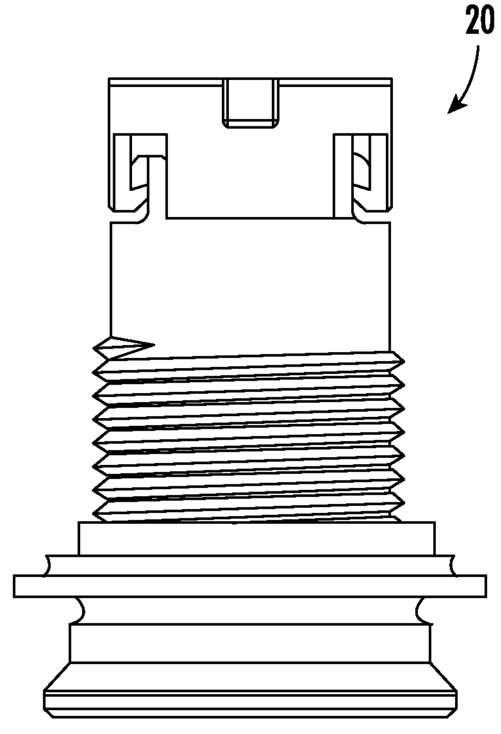
FIG. 9D is another side view of the assembled fiber optic receptacle shown in FIG. 9A.

Referring to FIGS. 5 and 6, a front-side perspective view of the retainer 46 of the fiber optic receptacle 20 of FIG. 1 is shown in FIG. 5, and a back-side perspective view of the retainer 46 of the fiber optic receptacle 20 of FIG. 1 is shown in FIG. 6. The opening 50 through the retainer 46 is sized to accommodate the second end of the alignment assembly 30 such that an optical connector and/or ferrule can be inserted through the opening 50 into the alignment assembly 30. The retainer 46 may be sized and shaped in any suitable manner. In the embodiments shown herein, the retainer 46 includes a cylindrical portion substantially similar in diameter to the internal end of the receptacle housing 22, thus it appears that the retainer 46 extends the length of the receptacle 20. As is shown in FIG. 6, the back-side of the retainer 46 defines a generally flat surface.

The retainer 46 is secured to the receptacle housing 22 at the internal end of the housing 22. The retainer 46 may be secured to the housing 22 in various ways, but in the embodiments shown, the retainer 46 defines a pair of retaining clips that are received by slots 48 defined by the receptacle housing 22. As such, the retainer 46 and the receptacle housing 22 of this embodiment are securely engaged. The alignment assembly 30 may only be removed from the internal side of the receptacle 20 in embodiments in which the receptacle is positioned within a wall of an enclosure. The retainer 46 is removed from the receptacle housing 22 in order to access the alignment assembly 30 or to access the back-side ferrule (not shown). In an alternative embodiment, the retainer 46 may be threadably attached to and removed from the receptacle housing 22.

In the embodiment shown, the retainer 46 includes a pair of tapered posts 62 that serve as supports for the springs 56 such that each spring 56 is mounted upon a respective post 62. The posts 62 are seated within recesses defined by the retainer 46. The recesses are an additional means for retaining the springs 56 during receptacle assembly and use. As stated above, the posts 62 are tapered in order to capture the springs 56 during assembly, thus facilitating the loading of the springs 56. The retainer 46 further defines a plurality of tangs 68 formed adjacent the opening 50 of the retainer 46. Four tangs 68 are shown with each tang 68 being positioned medially on one of the four sidewalls that define the opening 50. The tangs 68 are operable for guiding the alignment assembly 30 to properly align with the first (i.e., plug) fiber optic connector and the second (i.e., receptacle) fiber optic connector. The tangs 68 are sized to permit the alignment assembly 30 to rotate slightly within the opening 50. In other words, the tangs 68 allow slight angular rotation without allowing axial movement of the alignment assembly 30, thus allowing the angles on a pair of opposing angled physical contact (APC) ferrules to line up properly. The tangs 68, along with the chamfer of the alignment assembly 30, adequately provide for alignment of opposing APC ferrules.

A fiber optic plug of a fiber optic drop cable can be shown engaged with a fiber optic receptacle 20. At the same time, the drop cable associated with the plug is strain relieved at the receptacle 20. When a plug has not yet engaged the receptacle 20, the receptacle is preferably covered with some form or protective dust cap (not shown) operable for preventing water and contaminants, such as dust, dirt and insects, from reaching the internal cavity 24 of the receptacle 20. When removed, the dust cap may be retained on the receptacle 20 using a tether and reused if the plug is disengaged from the receptacle 20 at a later time. A dust cap may also be used to provide protection of the optical connector mounted on the drop cable prior to installation until the plug is engaged with the receptacle 20. Although a wall of an enclosure is not shown, a threaded coupling nut may be used to secure the receptacle 20 within a through opening in the wall of the enclosure. An elastomeric gasket may be disposed between the coupling nut and the flat surface defined by the flanged portion 26 of the receptacle housing 22. The wall of the enclosure is preferably disposed between the gasket and the coupling nut such that the gasket is compressed against the wall as the coupling nut is tightened. The gasket is provided to prevent water and contaminants from penetrating through the opening in the wall of the enclosure. In alternative embodiments, a protective boot may be disposed on the internal portion of the receptacle 20 to allow the assembly to be installed in a breathable enclosure and may become obsolete if the receptacle is otherwise reliably sealed from the environment.

Referring again to FIGS. 1 and 2, the outer periphery of the receptacle housing 22 is configured to define an alignment mark for keying alignment of the fiber optic plug with the receptacle 20. The plug and the corresponding receptacle 20 are configured to permit mating in only one orientation. In preferred embodiments, this orientation may also be marked on the plug using alignment indicia so that a less skilled field technician can readily mate the plug with the receptacle. Any suitable indicia may be used. After alignment, the field technician engages the external threads on the plug with the internal threads on the receptacle 20 to secure the plug to the receptacle 20. In an alternative embodiment, the plug may define internal threads and the receptacle housing 22 may define external threads. Furthermore, any type of cooperating engagement means, such as bayonet, snap-fit or press fit may be utilized.

The receptacle housing 22 of the fiber optic receptacle 20 is preferably configured for mounting to a wall of an enclosure, holds the alignment assembly 30 and aligns the plug ferrule with the back-side ferrule so that they engage in only one preferred orientation. This feature is especially advantageous for optical connections utilizing APC type ferrules where minimal angular offset is required, as well as multi-fiber ferrules that oftentimes are not centric. Additionally, the optical connection may be easily connected or disconnected by merely mating or un-mating a fiber optic plug with the receptacle 20, as previously described.

The foregoing is a description of various embodiments are given here by way of example only. Although the one-piece fiber optic receptacle has been described with reference to preferred embodiments and examples thereof, other embodiments and examples may perform similar functions and/or achieve similar results. All such equivalent embodiments and examples are within the spirit and scope of the present invention and are intended to be covered by the appended claims.

The invention claimed is:

1. A fiber optic receptacle comprising:

a receptacle housing defining an internal cavity opening through an internal end and an opposing external end;

an alignment assembly disposed within the internal cavity defined by the receptacle housing and received through the internal end, the alignment assembly comprising a plurality of alignment supports and an alignment sleeve having ends contained with each alignment support;

a retainer for retaining the alignment assembly within the internal cavity defined by the receptacle housing, the retainer having an opening and a plurality of tangs disposed about the opening;

at least one biasing member disposed within the receptacle housing that operatively engages with at least one of the retainer and the alignment assembly so as to urge the alignment assembly in the direction of the external end of the receptacle housing; and at least one biasing member support provided on at least one of the retainer and the alignment assembly for operatively supporting the at least one biasing member within the receptacle housing, wherein the at least one biasing member support comprises at least one tapered post that retains and guides a corresponding biasing member during assembly of the fiber optic receptacle.

2. The fiber optic receptacle of claim 1, wherein the at least one biasing member comprises a linear spring.

3. The fiber optic receptacle of claim 1, wherein the retainer is removable and wherein the alignment assembly is inserted into and removed from the internal cavity through the internal end of the receptacle housing when the retainer is removed from the receptacle housing.

4. The fiber optic receptacle of claim 1, wherein the retainer permits angular rotation of the alignment assembly while preventing axial movement of the alignment assembly.

5. The fiber optic receptacle of claim 1, wherein the fiber optic receptacle is configured for positioning in an opening in a wall of an enclosure.

6. The fiber optic receptacle of claim 1, wherein each alignment support prevents the alignment assembly from being improperly loaded into the receptacle housing.

7. The fiber optic receptacle of claim 1, wherein each alignment support extend such that they seat within guide channels defined within the internal cavity of the receptacle housing.

8. The fiber optic receptacle of claim 1, wherein each alignment support prevents the alignment assembly from being withdrawn through the opening defined by the retainer.

9. The fiber optic receptacle of claim 1, wherein each alignment support prevents the alignment assembly from being improperly loaded into the receptacle housing.

10. The fiber optic receptacle of claim 1, wherein each alignment support extends such that they seat within guide channels defined within the internal cavity of the receptacle housing.

11. A fiber optic receptacle comprising:

a receptacle housing defining an internal cavity opening through an internal end and an opposing external end;

an alignment assembly disposed within the internal cavity defined by the receptacle housing and received through the internal end, the alignment assembly comprising a proximal alignment support, a distal alignment support and an alignment sleeve having ends contained at least partially within each alignment support; and a retainer for retaining the alignment assembly within the internal cavity defined by the receptacle housing, the retainer having an opening and a plurality of tangs disposed about the opening.

12. The fiber optic receptacle of claim 11, further comprising at least one biasing member disposed within the receptacle housing that operatively engages with at least one of the retainer and the alignment assembly so as to urge the alignment assembly in the direction of the external end of the receptacle housing.

13. The fiber optic receptacle of claim 12, wherein the at least one biasing member comprises a linear spring.

14. The fiber optic receptacle of claim 12, further comprising at least one biasing member support provided on at least one of the retainer and the alignment assembly for operatively supporting the at least one biasing member within the receptacle housing.

15. The fiber optic receptacle of claim 14, wherein the at least one biasing member support comprises at least one tapered post that retains and guides a corresponding biasing member during assembly of the fiber optic receptacle.

16. The fiber optic receptacle of claim 11, wherein the retainer is removable and wherein the alignment assembly is inserted into and removed from the internal cavity through the internal end of the receptacle housing when the retainer is removed from the receptacle housing.

17. The fiber optic receptacle of claim 11, wherein the retainer permits angular rotation of the alignment assembly while preventing axial movement of the alignment assembly.

* * * * *